United States Patent [19]

Bigelow, Jr.

[11] 3,881,151

[45] Apr. 29, 1975

[54] EDDY CURRENT FLAW DETECTOR COMPRISING PASSING THE TEST PIECE THROUGH AN INVARIENT MAGNETIC FIELD GRADIENT AND POSITIONING SENSOR IN THE GRADIENT

[75] Inventor: Louis K. Bigelow, Jr., Acton, Mass.

[73] Assignee: Kennecott Copper Corporation, New York, N.Y.

[22] Filed: Jan. 7, 1974

[21] Appl. No.: 431,220

[52] U.S. Cl. .................................................. 324/37
[51] Int. Cl. ............................................ G01r 33/12
[58] Field of Search ............................... 324/37, 40

[56] References Cited
UNITED STATES PATENTS
3,273,055   9/1966   Quittner ............................. 324/37
FOREIGN PATENTS OR APPLICATIONS
573,152   11/1945   United Kingdom ................... 324/40

Primary Examiner—Robert J. Corcoran
Attorney, Agent, or Firm—John L. Sniado; Lowell H. McCarter; John A. Lahive, Jr.

[57] ABSTRACT

A method and apparatus for the detection of eddy currentimpeding flaws in moving electrically conductive objects such as tube, bar, wire, and wire rods, especially rods moving at high speeds. Detectable flaws include metal faults such as laps, cuts and seams as well as entrapped foreign materials. The detector operates by generating eddy currents in cross-sections of the rod as it passes through a magnetic field gradient where the field increases or decreases in magnitude in the direction of rod motion. The unidirectional field change produces eddy currents which circulate in a single direction. Pickup coils sense changes in the magnetic field associated with this "direct" eddy current occasioned by the passage of a flawed portion of the rod.

10 Claims, 6 Drawing Figures

FIG. 3
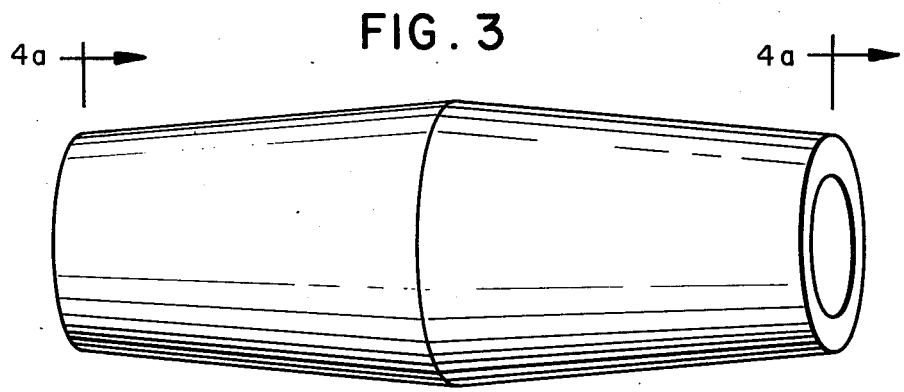
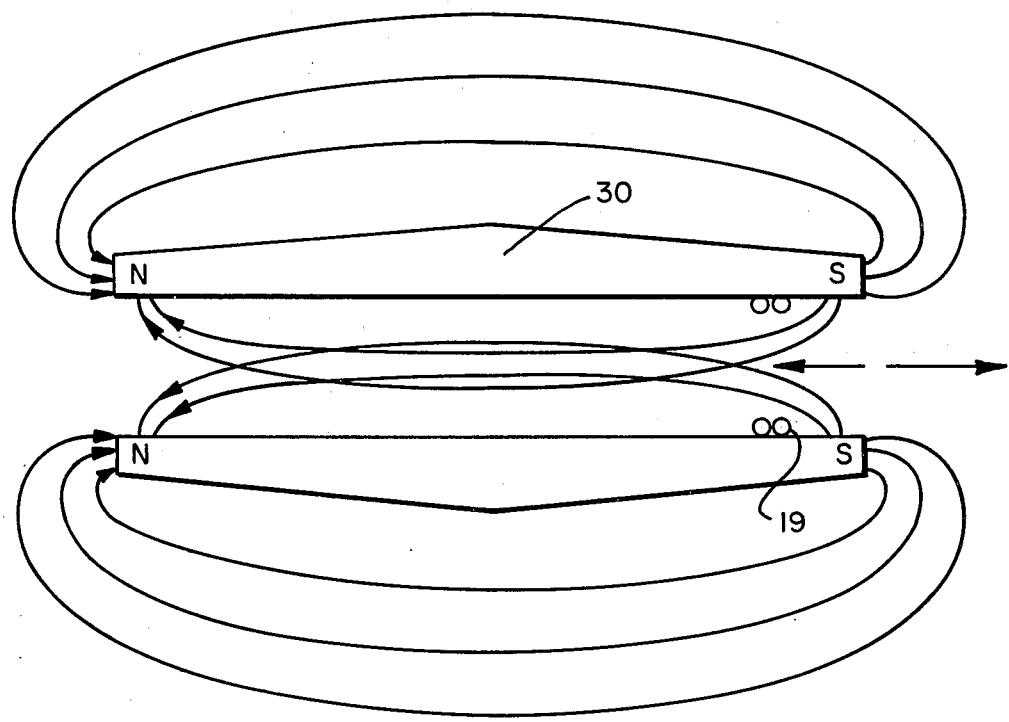
FIG. 4
FIG. 5
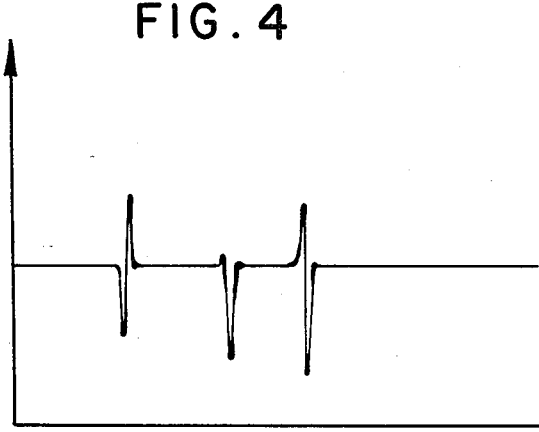

EDDY CURRENT FLAW DETECTOR COMPRISING PASSING THE TEST PIECE THROUGH AN INVARIENT MAGNETIC FIELD GRADIENT AND POSITIONING SENSOR IN THE GRADIENT

FIELD OF THE INVENTION

This invention relates in general to a method and apparatus for detecting flaws in moving metallic rods and more particularly to an apparatus for measuring flaws by sensing changes in eddy current induced in the moving rod as it passes through a fixed magnetic field gradient.

BACKGROUND OF THE INVENTION

In the general field of nondestructive testing, particularly with respect to continuous manufacturing processes, one known method for detecting anomalies in dimension or composition of moving metallic rods consists in measuring the eddy current induced in the rod by the application of an external high frequency alternating magnetic field. The eddy current induced in the rod is usually measured by a pair of sensing coils mounted concentrically around the rod. When the eddy current changes from one point on the rod to the next due to a change in physical characteristics or a discontinuity, the sensing coils detect this change and provide signals indicating the anomaly or discontinuity. A flaw detector of this type is, for example shown in U.S. Pat. No. 3,617,874.

In devices operating by these principles, increasingly higher frequencies of the magnetic field must be applied at higher speeds of the rod in order to apply a sufficient number of cycles of the field so that short defects can be resolved. This requirement of a high frequency for resolution of the flaws is associated, however, with undesirable limitations imposed by the skin effect in materials of high conductivity and permeability. At relatively high frequencies the skin depth which can be penetrated by the external magnetic field becomes increasingly shallow and consequently renders difficult, or impossible, detection of flaws in metallic rods at any significant depth within the rod. The major improvement of the present invention over prior art is that it overcomes the depth limitation of a-c eddy current devices when materials of higher conductivity and permeability are inspected at high speeds. The invention is not limited to high speeds, however, and can be used to detect flaws whenever there is relative motion between the workpiece and the device.

SUMMARY OF THE INVENTION

Broadly speaking, in the present invention flaws in a moving metallic rod are detected by passing the rod through a magnetic field gradient which remains constant in time and detecting changes in eddy current induced in the rod due to discontinuities in dimension or properties of the material. By moving the rod axially through a magnetic field which exhibits a gradient in the direction of movement of the rod, a time rate of change of magnetic flux through a rod cross-section is generated proportional to the product of the field gradient, which is constant, the speed of the rod, which is constant, and the cross-sectional area of the rod. Since the external field changes in only one direction, the emf generated in the rod operates in only one direction. Accordingly, a flaw in the metal rod which either reduces the cross-sectional area of the rod or changes the resistivity of the metal forming the rod produces a change in the eddy current circulating in the cross-sectional area. In one embodiment, a pair of sensing coils oppositely wound and connected in series are mounted concentrically around the rod at a point along the axis within the field. Electrical noise from external sources is cancelled by the oppositely wound coils but signals associated with rod flaws pass through the two coils sequentially and therefore are not cancelled. The imposed magnetic field gradient may be created either by a particular shaped permanent magnetic or by an appropriate electromagnet. It can be shown that at rod speeds, for example of 3600 feet per minute, the magnetic field gradient can be chosen such that anomalies can be measured throughout the cross-section of a quarter inch rod. The sensing coils may have the same general configuration as those in the prior art embodiments and the output from these coils is generally coupled to a differential amplifier, with the output from the amplifier provided to a chart recorder or an oscilloscope.

BRIEF DESCRIPTION OF THE DRAWINGS

FIG. 3 is an illustration generally in perspective view of a permanent magnet suitable for use in an apparatus constructed in accordance with the principles of this invention; and FIG. 4 is a cross sectional illustration taken along the line aa of FIG. 3.

FIG. 5 is an illustration of an oscilloscope trace resulting from the output of circuitry shown in FIG. 2.

DESCRIPTION OF PREFERRED EMBODIMENTS

Figure 1:
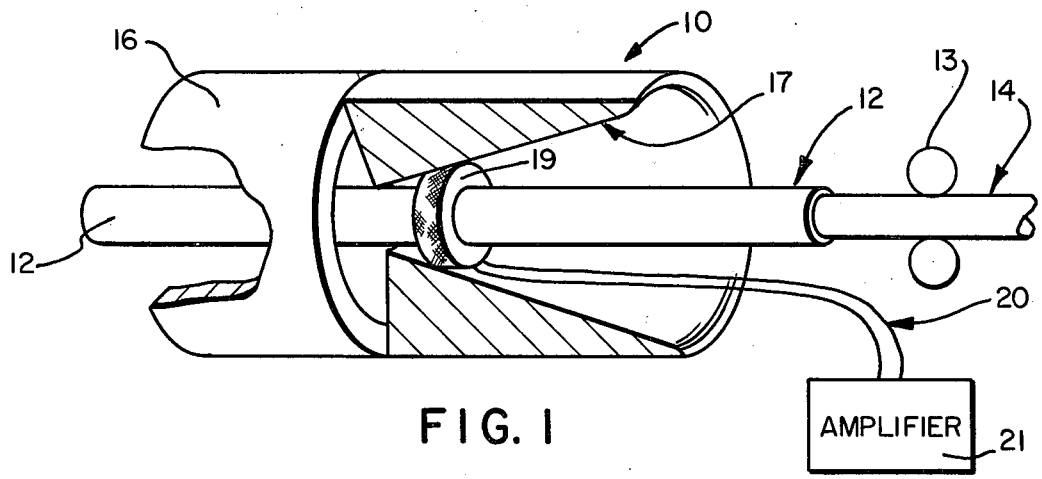
FIG. 1 is an illustration in perspective view of a flaw detector constructed in accordance with the principles of this invention, having a cutaway portion to illustrate the construction of this detector.

With reference now to FIG. 1 there is shown one possible embodiment of a detector assembly. A metal rod 14 is fed by a pair of driver rollers 13 through a cylindrical passageway formed by a guide tube 12. Typically the guide tube 12 is made of phenolic material or a non-ferromagnetic metal and, in the specific arrangement shown, has an OD of three-fourths of an inch and an ID of 11/16 of an inch. The tube 12 extends axially through the center of a cylindrical, axially magnetized permanent magnet 16, having a length of 3 inches and an outer diameter of 3 inches. A cylinder 17 formed of ferromagnetic material such as steel having an inner taper along the axis is also concentrically mounted over the tube 12 and is in contact with the magnet section 16. The outer diameter of the steel member 17 is also 3 inches and its length is 4¼ inches. A pair of pickup coils 19 are mounted around the tube 12 at a position ∼2 inches from the free end of the tapered section 17. These pickup coils are conventional in the art and are connected in opposition so that a changing magnetic field in a given direction will induce currents of opposite direction in the two coils. A pair of leads 20 carry electrical signals from the coil assembly 19 to an amplifier 21.

Figure 1A:
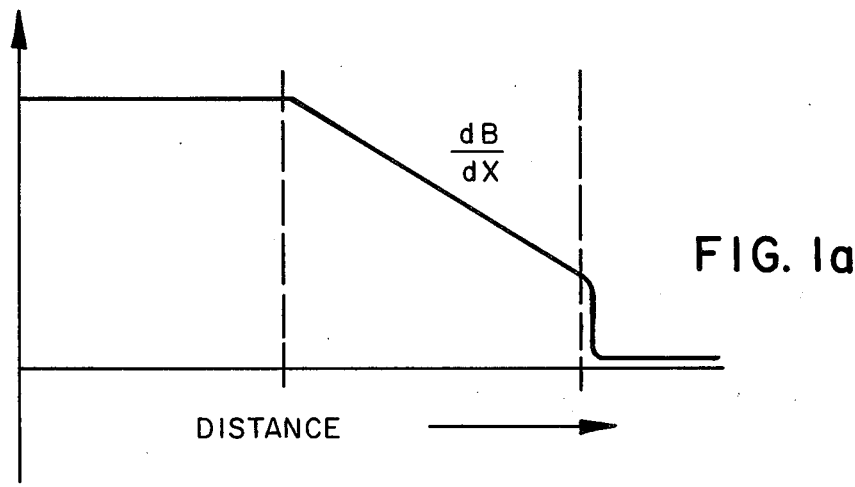
FIG. 1a is an illustration in graphical form of the magnetic field along the axis of the cross-section of FIG. 1.

In FIG. 1a there is illustrated a graph of the field intensity along the axis of the inside tapered section 17. As can been seen the axial field gradient is roughly linear, increasing from the open end of the taper toward the narrow end of the taper. A suitable value for the field gradient is 2000 gauss per centimeter. The exact position of the coils 19 is not critical although the coils should be placed sufficiently far from the end of the tapered section of the magnetic field. When the coils are positioned in a linear field gradient any vibration or impact which moves the pair of coils longitudinally will cause no variation in produced signal. It is desirable that at any point along the axis the field be substantially homogeneous inside a circular ring concentric about the axis end of sufficient radius to include the guide 12 within it.

The rod 11 passes through the cylinder 12 at a suitable speed, for example, 3600 feet per minute. The flaw signals are generated by application of the physical principles discussed below.

According to Maxwell's laws;

$$\nabla \times \overline{E} = -\frac{1}{c}\frac{\partial \overline{B}}{\partial t}, \quad (1)$$

where $c$ is the speed of light. This can be written in integral form:

$\mathcal{E}$ = electromotive force =

$$\oint_\tau \overline{E} \cdot d\overline{l} = -\frac{1}{c}\frac{\partial}{\partial t}\int_A \overline{B} \cdot d\overline{A} \quad (2)$$

This equation states that the electromotive force around any closed loop in space, $\tau$, is equal to the negative time rate of change of the total magnetic flux penetrating the area bounded by the loop. The emf generated at the surface of a rod passing through an axial magnetic field gradient can be calculated by simplifying the equations as follows:

$$\mathcal{E} = -\frac{1}{c}\left(\frac{dB}{dx}\right)\left(\frac{dx}{dt}\right)\left(A_{rod}\right) \quad (3)$$

where
 ($dB/dx$) is the axial magnetic field gradient, where the assumption has been made that the gradient is constant over the rod cross-section,
 ($dx/dt$) is the axial velocity of the rod, and
 $A_{rod}$ is the cross-sectional area of the rod.

The effect of the emf generated as described by equation (3) is to cause eddy currents to flow circumferentially around the rod. It should be noted that the emf generated at different depths within the rod will be proportional to the cross-sectional area enclosed within the radius from the rod center to that depth.

If the field has a linear gradient and the speed of the rod is fixed, the emf for a given cross-section is the same regardless of where in the linear portion of the field the cross-section may be. The constant emf induces a steady-state eddy current which circulates in the given cross-section always in the same direction because the external field changes always in the same direction as the rod 11 progresses along the cylindrical axis.

The circulating eddy currents in the given cross-section generate a local axial magnetic field, analogously with the behavior of a solenoid. In accordance with Lenz' Law the axial field associated with the local eddy currents operates in a direction which opposes and partially cancels the change in the external applied magnetic field through which the section of rod passes.

Detection of rod flaws is achieved by the pickup coils 19 through which the moving rod passes. The pickup coils 19 experience a magnetic flux from two sources, the magnetized tapered steel section 17 and the moving rod 14. The field from the magnetized section 17 is constant at any particular point along the axis. Thus, the pickup coils 19 are exposed to a constant flux from the first source. If the passing rod 14 was unflawed, each cross-section would have identical area and identical resistivity. Not only would the emf experienced by a given cross-section be the same through the linear portion of the external field but each identical cross-section would experience the same emf. Consequently, each cross-section would have the same steady-state eddy current circulating in it in regions having the same magnetic field gradient. The pickup coils 19 also sense this second magnetic field, opposite in direction to the external field as Lenz' Law dictates and constant in magnitude as long as the rod is unflawed. The resultant field from the two sources is constant and without magnetic flux change there is no emf induced in the pickup coils. However, a flaw in the metal rod 14 changes the field produced by the eddy currents.

When the flaw is a dimensional discontinuity, it may reduce or increase the cross-sectional area of the rod. Since the emf varies with the area as shown in equation (3) then the emf in the flawed cross-section will be different than that in the normal cross-section. Where the cross-section is, for example, smaller, the reduced emf lowers the eddy-current circulating in the flawed cross-section and the magnetic field induced by the eddy currents drops accordingly. The pickup coils register nothing when the normal cross section passes through since the field produced by eddy currents in the normal cross-section is the same as the field produced by eddy currents in the other identically unflawed cross-sections which pass through the pickup coils. However, when the flawed cross-section moves through the coils, the total magnetic flux through the coils changes due to the reduced field produced by the eddy currents and an emf is generated in the coils. When the metallic flaw is one which changes the resistivity in a cross-section of the rod 14, the area and emf would be unchanged but the magnitude of the eddy current will vary with the change in resistivity. For example, a lap or a seam could increase resistivity and lower the total eddy current circulating in the cross-section. Again the induced field reflects this decrease and the pickup coils 19 sense it.

Figure 2:
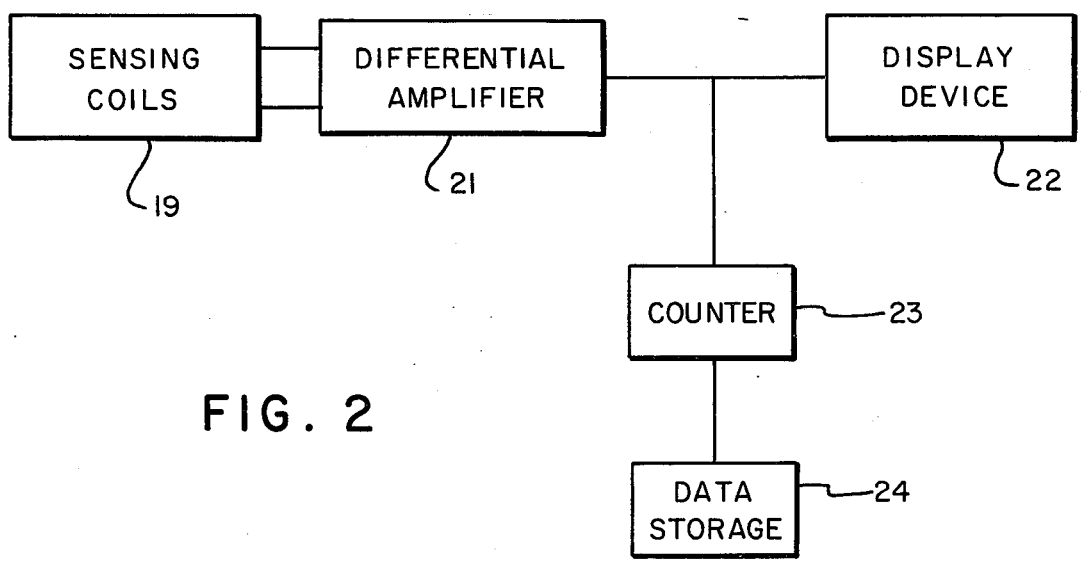
FIG. 2 is an illustration generally in block diagrammatic form of circuitry suitable for use in conjunction with the detector shown in FIG. 1.

In FIG. 2 circuitry for obtaining a signal from the sensing coils and displaying it on an output device is illustrated. The sensing coils 19 are shown connected to the inputs of a differential amplifier 21. This amplifier is of conventional type having a voltage gain of 50 to 70 dB, providing as an output a signal related to the difference between the signals appearing on its input. The output of the differential amplifier is provided to a display device 22 which can be a conventional oscilloscope or a strip chart recorder. This output is also provided to a digital counter 23 having a threshold determining circuit and circuitry for counting pulses rising above that threshold. The output from this counter 23 is connected to a data storage unit 24, which may be any form of memory, for example a digital computer.

The form of signal output appearing on the output terminal of amplifier 21 is illustrated in FIG. 5. In FIG. 5 the middle pulse represents the pulse generated by the discontinuity in current induced in the sensor coils 19 as a result of a gouge in the surface of a metal rod passing through a magnetic field gradient, such as that illustrated in the device of FIG. 1. The pulses at either end of the trace represent pulses generated by the passage of the beginning and end of that rod.

With reference now to FIG. 3 and FIG. 4 there is shown a cylindrical magnet 30 with detector coils 19 disposed in the central opening near one end. Typically this magnet would have a length of 7 inches and an end outer diameter of 1½ inches. As indicated by the diagrammatic flux lines there is a field reversal at approximately the entrance of the magnet and hence a very strong magnetic field gradient exists in that region. If rod speeds are considerably greater than 3600 ft. per min., or if the workpiece is of large diameter the depth of detection could become shallower than desired because a finite time is required for penetration of the field. A large period of time in the field gradient may be desirable before entering the coils in this case. In the case of the cylindrical magnet geometry illustrated in FIG. 4, the sensing coils could be moved nearer the center of the magnet where the field gradient is less steep and is spread out over a greater distance. By application of this principle the desired depth of field penetration can be obtained. Eddy currents generated in different regions of the field will generally die out quite rapidly. For example, eddy currents in a 5/16 inch diameter copper rod at 68°F and travelling 3600 ft. per min. will substantially decay before they have travelled one-fourth inch from the point where they were generated.

I claim:

1. An apparatus for detecting flaws in extended metallic pieces comprising, means generating a time invariant magnetic field gradient in a first direction, transport means for transporting said metallic piece axially in said first direction through said magnetic field gradient, sensing means disposed within a region of said magnetic field gradient wherein the change of field per unit distance is substantially constant, said sensing means being in close juxtaposition to the position of a metallic piece transported by said transport means through said magnetic field gradient, said sensing means being insensitive to noise from external sources and producing an output signal which varies in relation to variations in the net magnetic field caused only by variations in eddy current within said transported metallic piece, and output means coupled to said sensing means for providing an output indication of the variations in said sensing means signal to indicate flaws in said transported metallic piece.

2. An apparatus in accordance with claim 1 wherein said means for producing a magnetic field gradient comprises a permanently magnetized cylindrical magnet.

3. Apparatus in accordance with claim 2 wherein said means for producing a magnetic field also includes a cylindrical member extended axially in said first direction and positioned adjacent said magnet, said cylindrical member being formed of a material having high permeability and having an internal taper in said first direction.

4. Apparatus in accordance with claim 1 wherein said sensing means comprises a pair of closely spaced induction coils concentrically mounted with respect to the axis of transport of said metallic pieces, said coils being electrically connected in opposition such that a change of magnetic field in only a first direction produces electromotive force in opposing directions within said coils.

5. Apparatus in accordance with claim 4 wherein said induction coils are connected in series opposition and wherein said sensing means further includes a differential amplifier connected across the serial combination of said sensing coils to produce an output signal in accordance with variations in the net current across said coils.

6. Apparatus in accordance with claim 5 wherein said output means comprises an oscilloscope coupled to said differential amplifier.

7. Apparatus in accordance with claim 5 wherein said output means comprises a pulse counter coupled to the output of said differential amplifier.

8. Apparatus in accordance with claim 4 wherein said transport means transports said metallic pieces along said axis in said first direction at a linear velocity of substantially 3600 feet per minute.

9. A method of measuring flaws in extended metallic pieces comprising, transporting said metallic pieces in a first direction through a magnetic field having a time invariant gradient in said first direction; sensing at first and second closely spaced positions within said field gradient, variations as a function of time in total magnetic field, and providing an output indication of the difference in said variations between said first and second positions as indicative of variations in composition or dimensions of said metallic pieces.

10. The method of claim 9 wherein said magnetic field gradient has a value of substantially 2,000 gauss per centimeter and said metallic pieces are transported along said axis in said first direction at a linear velocity of substantially 3600 feet per second.

* * * * *

UNITED STATES PATENT OFFICE
CERTIFICATE OF CORRECTION

Patent No. 3,881,151        Dated  April 29, 1975

Inventor(s)  Louis K. Bigelow, Jr.

It is certified that error appears in the above-identified patent and that said Letters Patent are hereby corrected as shown below:

Claim 10, line 5, "second" should read -- minute --.

Signed and Sealed this

Eighth Day of March 1977

[SEAL]

Attest:

RUTH C. MASON
*Attesting Officer*

C. MARSHALL DANN
*Commissioner of Patents and Trademarks*